April 3, 1951 D. E. WIEGAND 2,547,297

ELECTROMAGNETIC TRANSDUCER HEAD

Filed Dec. 24, 1947 2 Sheets-Sheet 1

Inventor
DAVID E. WIEGAND.

by The Firm of Charles W. Hills Attys.

April 3, 1951 D. E. WIEGAND 2,547,297

ELECTROMAGNETIC TRANSDUCER HEAD

Filed Dec. 24, 1947 2 Sheets-Sheet 2

Inventor
DAVID E. WIEGAND.

by The Firm of Charles W. Hills Attys.

Patented Apr. 3, 1951 | 2,547,297

UNITED STATES PATENT OFFICE 2,547,297

ELECTROMAGNETIC TRANSDUCER HEAD

David E. Wiegand, Villa Park, Ill., assignor to Armour Research Foundation of Illinois Institute of Technology, Chicago, Ill., a corporation of Illinois Application December 24, 1947, Serial No. 793,728

11 Claims. (Cl. 179—100.2)

This invention relates to an electromagnetic transducer head, and more particularly, to a low impedance head having high current density in the head structure.

In one method of magnetic recording, a lengthy magnetizable medium is drawn across an electromagnetic transducer head assembly at substantially uniform linear velocity. The head assembly includes a magnetic core member having a non-magnetic gap over which the medium passes and which is provided with suitable current conducting exciting elements to produce a magnetic field across the gap.

During the recording operation, current is caused to flow in exciting elements in accordance with the time variations of an intelligence to produce a time-varying magnetic field in the core in accordance with the value thereof. The lengthy magnetizable medium is subjected to the influence of this field as it is drawn therethrough, and magnetization is imparted to incremental lengths of the medium in accordance with the time variations of the intelligence, thus causing variations in the magnetization of the medium along its length in accordance with the time variations of the intelligence.

During reproduction, the lengthy magnetizable medium is drawn across the same or a similar head assembly to set up a flux in the core portion thereof in accordance with the magnetization of the medium along successive incremental lengths thereof as it passes across the gap of the magnetic core member. The resultant time-varying flux induces voltage in the coil with which the fluix is linked in accordance with the time rate of change thereof. This voltage may be amplified and suitably reproduced by a loudspeaker or similar device to reproduce the intelligence recorded.

This magnetic recording and reproducing inherently involves the conversion of an intelligence to a time-varying magnetic field during the recording operation, and the conversion of a time-varying magnetic flux to an intelligence in the reproducing operation. It is of utmost importance that the mechanism provided for this purpose be free from effects due to stray magnetic fields. These magnetic fields may be produced by apparatus located in the vicinity of the magnetic recorder or may be produced by component parts of the magnetic recorder itself such, for example, by the electric motor which is used to drive the magnetizable medium. The stray magnetic field, when picked up in the head assembly, frequently produces an annoying hum which is reproduced in the audible output of the apparatus, or which is recorded on the magnetizable medium and later reproduced through the audible output of the apparatus reproducing the record. In accordance with my invention, this hum, together with other disturbances associated with stray magnetic fields, are overcome by suitable balancing means in the electromagnetic transducer head assembly itself.

Great improvements have been made in the magnetic recording field of recent years, and to some extent this has been brought about by the development of relatively high coercive force materials which could be formed into a wire or tape for use as a magnetic record member. It has been found that the maximum capabilities of high coercive force material can only be utilized when certain conditions are present. For example in the recording process, intense magnetic fields are required, and these intense fields are obtained by the present invention with a minimum amount of leakage flux which tends to demagnetize the high frequency.

A further feature of the present invention is the ability of the heads designed in accordance with the teachings of the present invention to erase high coercive force material without overheating of the head structure.

In general, intense magnetic fields in electromagnetic apparatus are obtained only by operating the electrical part of the apparatus at high current density. The head structures of the present invention obtain this result with substantially a single-turn coil operated at extremely high current density. Because of its short length and because of rapid heat conduction to relatively heavy masses of copper which form at least a part of the low inpedance coil, efficient operation of the head is obtained.

Moreover, it is frequently desirable in a magnetic transducer head assembly to provide an arrangement having a large impedance ratio so that the unit may be effectively connected to a high impedance circuit, such, for example, as the grid cathode space path of an electron discharge device.

One of the principal features and objects of the present invention is to provide an electromagnetic transducer head of the above general characteristics which is of novel structural design and which has hum-bucking characteristics at least in part.

A further feature and object of the present invention is to provide a novel combination electromagnetic transducer head and coupling transformer which are built together as a single unit.

A further object of the present invention is to provide a novel coupling transformer for use in magnetic recording apparatus.

Another and further object of the present invention is to provide a novel transformer winding.

Another and still further object of the present invention is to provide a novel electromagnetic transducer head for magnetic recording apparatus in combination with a coupling transformer and having a hum-bucking characteristic both as to the head and as to the transformer.

The novel features which I believe to be characteristic of my invention are set forth with particularity in the appended claims. My invention itself, however, both as to its organization, manner of construction, and method of operation, together with further objects and advantages thereof, may best be understood by reference to the following description taken in connection with the accompanying drawings, in which:

Figure 1:
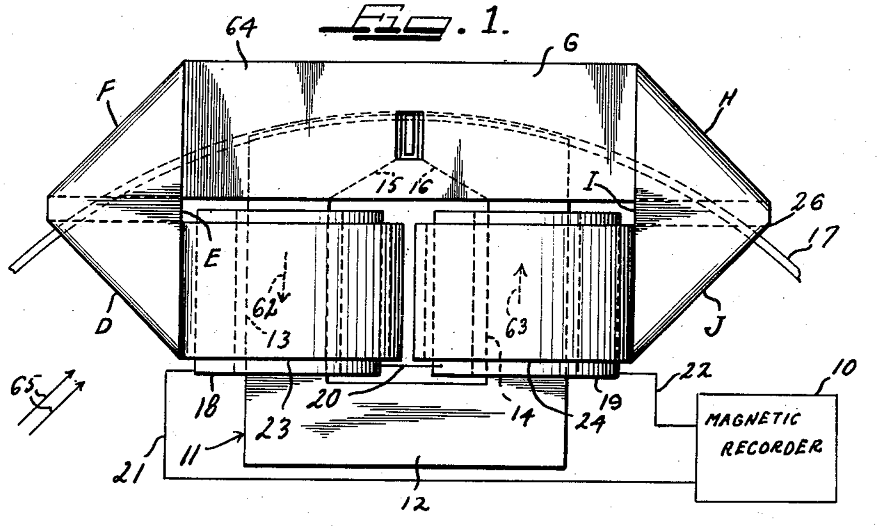
Figure 1 is a front elevational view of an electromagnetic transducer head embodying the novel teachings and principles of the present invention.
Figure 2:
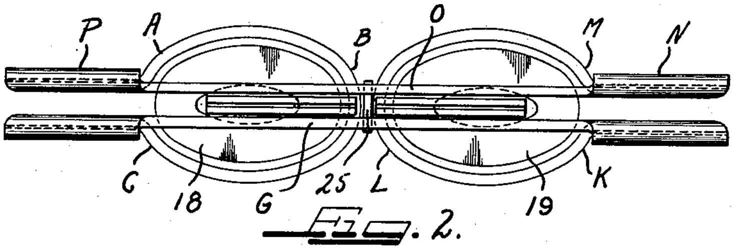
Figure 2 is a top view of the electromagnetic transducer head shown in Figure 1.

Referring first to the embodiment of the invention illustrated in Figures 1 and 2 of the drawings, the electromagnetic transducer head shown therein includes a built-in coupling transformer having a core piece 11 which, as shown, is in the form of a single lamination formed of magnetic material having high permeability but low retentivity. The core 11 is of the simple rectangular type and includes a base portion 12, upstanding leg portions 13 and 14, and two top arm portions 15 and 16. The confronting faces of the top portions 15 and 16 are slightly spaced to form a magnetic gap across which a traveling record member 17 is arranged to pass. When the record member 17 is a wire, the top edge of the core 11 is grooved as at 17a so that the wire may be conveniently confined to a single path as it successively crosses the leg 15, the gap, and the leg 16.

As will be noted from an inspection of the drawings, this core piece 11 serves as the core for both the transformer and the head itself.

The transformer portion of the head includes two high impedance windings 18 and 19 which are mounted, respectively, on the legs 13 and 14. These windings 18 and 19 have a like number of turns and are serially connected together as at 20 and have outside leads 21 and 22. They also are wound in such direction with respect to each other that currents induced therein by a fluctuating stray field oppose each other.

Two substantially single-turn windings 23 and 24 are inductively associated with the windings 18 and 19, respectively. These single-turn windings 23 and 24 are connected as closed loops, a portion of each loop being in common to the other loop and are also of complex shape for a reason which will presently be pointed out. More particularly, the windings 23 and 24 are made from a continuous flat strip 64 of conducting material, such for example, as copper, having a width which is substantially as great as the height of the coils 18 and 19. The configuration of the flat strap which makes up the windings 23 and 24 may be readily understood by an inspection of Figures 1 and 2 of the drawings. This may further be understood by tracing successive portions of the strap from any arbitrary starting point, such, for example, as the back side of the coil 18, then around the coil 18 as at A—B—C making substantially a complete wrap around the coil 18. Thereafter, the strap is bent along a substantially 45° diagonal line D (Figure 1) to extend upwardly in a region E to a point above the coil 18 where it is bent along another substantially 45° diagonal line F in such a way that it can extend across above the coils 18 and 19 in a portion G.

It will be observed that in this stretch G the strap passes the pole portions 15 and 16 of the core 11. After the strap has extended to a point beyond the coil 19, it is folded down along a substantially 45° line H, so as to extend straight downwardly in a portion I until it is substantially opposite the coil 19.

At this point, it is bent along another substantially 45° line J, and then wrapped around the coil 19 as at K—L—M. Thereupon, it is bent upwardly and across above the coils 19 and 18 as at O, there being an appropriate lower bend or fold (not seen in the drawings) and an upper fold N. After crossing behind the core 11, it is folded down again as at P, and then folded again so as to start the wrap A—B—C. The two coils associated with the high impedance coils 18 and 19 are represented, of course, by A—B—C and K—L—M, respectively. The remaining portions of the strap being the leads of the coils.

In addition to the above, a bridging member 25 is electrically connected to the portions G and O thereby closing the loop circuit of the coil portions A—B—C as well as the loop circuit of the coil portions K—L—M. This bridging member 25 is disposed in the gap between the pole portions 15 and 16, and is thus arranged to produce flux in the core 11 in accordance with current flow through the bridging member 25.

Most conveniently, the bridging member 25 takes the form of a piece of copper foil soldered or otherwise secured to opposed portions G and O of the strap assembly.

From the above description it will be apparent that the bridging member 25 is positioned together with the continuous strap forming the loops 23 and 24 in such a manner as to divide the current path into two symmetrical halves. Current flow through member 25 sets up a magnetic field about member 25 which field lies in a plane transverse to the member 25. This results in magnetic flux being developed in core 11 which in turn produces a relatively intense magnetic field across the gap between the pole portions 15 and 16. The actual intensity is, of course, determined by the reluctance of the magnetic path defined by the core 11, the length of the gap between the pole portions 15 and 16 and the intensity of current flow through the bridge 25.

The operation of the above described electromagnetic transducer head assembly will now be described. The coils 18 and 19 are connected to the magnetic recorder unit diagrammatically represented at 10. This unit contains elements to convert intelligence such as sound, for example, to a time-varying voltage which is impressed across the coils 18 and 19. During the reproducing operation the magnetic recorder unit 10 includes elements to convert the time-varying voltage in coils 18 and 19 to the original intelligence such as, for example, sound.

It has been previously pointed out that the coils 18 and 19 are wound in such a direction that current flow through these coils sets up an aiding flux with respect to each other. Accordingly, current flow in these coils 18 and 19 associated with the voltage produced by the recorder unit 10 causes oppositely directed fluxes to be developed in the core portion of the core 11 as indicated by the arrows 62 and 63. Since these fluxes or magneto-motive forces are in like direction and additive relationship as the core 11 is traversed, the total flux produced therein is that associated with the combined operation of the two coils 18 and 19. The two substantially single turn windings 23 and 24 formed by the portions A—B—C and K—L—M of the flat strap 64 also link the flux produced by current flow through the coils 18 and 19. Voltages are induced in these substantially single turn windings 23 and 24 tending to cause current flow therethrough and this current flow in each single turn coil is in such a direction that the current from each coil passes through the bridge 25 which is common to both coils. Current flow in the bridge member 25 produces a magnetizing magneto-motive force in the gap between the pole portions 15 and 16 which magnetizes incremental lengths of the record member 17 in accordance with the time variations of the signal being recorded.

It will be observed that the stray flux, such for example as might be found in the direction suggested by the arrow 65 in Figure 1, has no appreciable effect on the voltage produced across the bridge member 25, even though the direction of the flux 65 has a component in alignment with the windings 18 and 19 and the windings 23 and 24. The reason for this lies in the fact that such flux produces like fluxes in the opposite upright legs of the core 11. These fluxes produce voltage in the windings 23 and 24 which are of substantially equal magnitude and which tend to set up currents in the windings 23 and 24 in opposition to each other, insofar as flow through the bridge member 25 is concerned. In other words, there is no tendency for a voltage to be produced across the bridge member 25 as a consequence of this flux. It will thus be observed that the above described head is hum bucking both as to the head portion proper as well as to the transformer portion of the assembly.

When the unit is used as a play back head so that the record number 17 produces a time-varying voltage for application to the recorder 10, the stray field flux 65 likewise produces no effect on the output voltage inasmuch as it is of like direction with respect to the single turn windings 23 and 24 which cancel out.

Objectionable stray fields of magnetic recording and reproducing apparatus may, of course, come from the motor which is used to move the magnetic record member across the head, from the power transformer, or from other apparatus in the vicinity of the magnetic recorder. The present invention eliminates the objectionable hum which would otherwise be encased by such stray fields.

The method of turning corners as above described for the strap 64 equalizes the length of the filamentary current path in the strap 64. For example, it will be observed that the filamentary current path from the bottom edge of the strap 64 as it is wrapped around the coil 19 extends up the left-hand edge of the upright portion I of the strap until it reaches the top of the portion G, and then across to a point opposite the bridging member 25. This path is the same length as the path which would be followed by the filamentary current from the upper edge of the portion of the strap as it is wrapped around the coil 19 to the outer right-hand corner 26, then up and across the lower edge of the upper portion G of the strap. Note that the distances of these two paths are exactly the same.

It will be observed from the above description that the linkage between the low impedance circuit and the coils is very good, since each of the coils is encircled by the copper strap. The effective eddy current shield plate is obtained by the strap itself, which also acts as the low impedance circuit. While the strap is shown as a single continuous length, it will, of course, be appreciated by those skilled in the art that it may be made up of separate pieces joined together by soldering or the like where convenience of assembly is desired.

It has been found that a head of the above construction has a lower hum level due to its hum-bucking construction, and has a better high frequency response due to the greater amount of interleaving of the respective elements.

Figure 3:
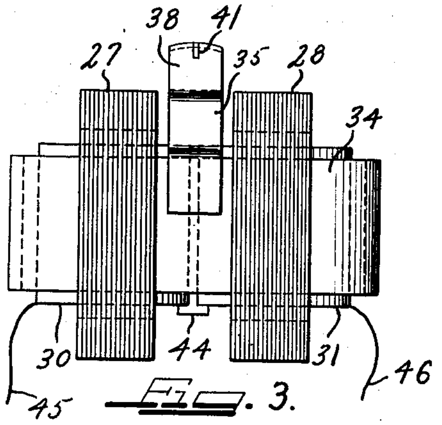
Figure 3 is a front elevational view of a second embodiment of the present invention.
Figure 4:
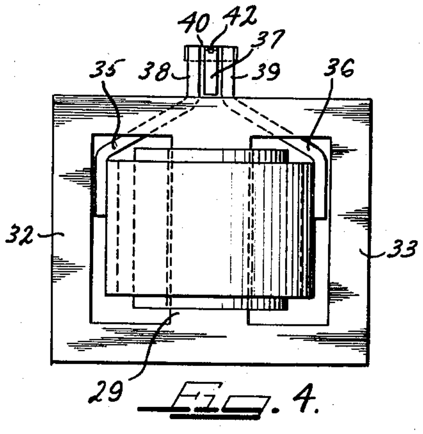
Figure 4 is a right end view of the embodiment of the invention shown in Figure 3.
Figure 5:
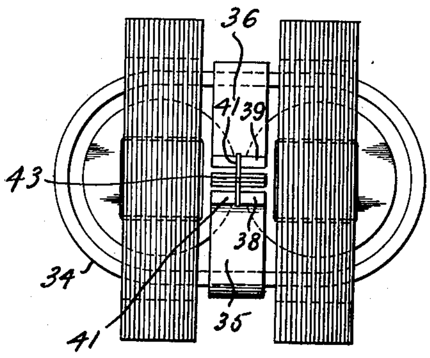
Figure 5 is a top view of the embodiment of the invention shown in Figure 3.

Figures 3, 4 and 5 illustrate another embodiment of the present invention. More particularly, two rectangular core-type transformer elements 27 and 28 are employed, each having a center leg 29 upon which the high impedance windings 30 and 31 are wound, respectively, and two side legs 32 and 33. The core members 27 and 28 are made up of a large number of laminations as shown in the drawings. A strap member 34 is formed into an oval which extends around the two windings 30 and 31. It will be observed that the core members 27 and 28 are disposed in close proximity to each other and in substantially parallel planes.

Secured to the parallel portions of the oval strap 34 between the cores 27 and 28 are a pair of arms 35 and 36 which extend diagonally upwardly and inwardly to a point on opposite sides of the core piece 37 of the head structure, and at this point they are bent upwardly in parallel portions 38 and 39, as may be seen best in Figures 4 and 5 of the drawings.

A bridging member 40 extends between the end portions 38 and 39, the ends 38 and 39 being slotted as at 41 to receive the ends of the bridging member 40.

The arms 35 and 36 and the bridging member 40 are all of conducting material, and thereby, together with the oval strap 34, form a pair of closed circuits which in effect comprise substantially single-turn coils inductively associated with the coils 30 and 31, the two closed circuits having a portion of the respective paths in common by virtue of the bridging member 40 which forms part of each path. The core piece 37 is slotted as at 42 to receive the wire 27. The core is also slotted for the reception of the bridging member 40 as at 42. This, in effect, provides a pair of polar portions in the core 37 with the bridging member 40 lying in the gap between the poles. The coils 30 and 31 are serially connected together as at 44 and are electrically connected to an external circuit through the leads 45 and 46. Thus, when fluctuating signal energy is supplied through the conductors 45 and 46, the traveling wire 17 is longitudinally magnetized due to the circular field about the bridging member 40. This particular embodiment of the present invention provides hum bucking in the transformer when the coils 30 and 31 are wound in such a direction with respect to each other that induced currents due to hum fields oppose each other.

The arrangement of the broad strap also produces an eddy current shield plate effect which intensifies the field in the region of the gap.

Figure 6:
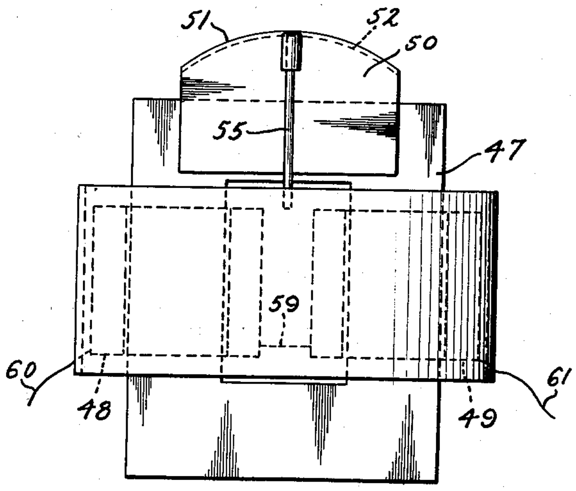
Figure 6 is a front elevational view of a third embodiment of the present invention.
Figure 7:
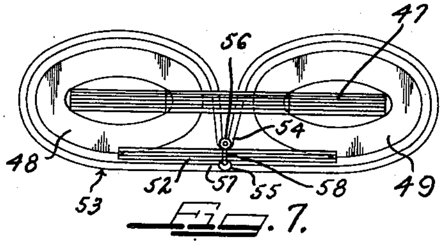
Figure 7 is a top view of the electromagnetic transducer head and coupling transformer shown in Figure 6 of the drawings.

A third embodiment of the present invention is illustrated in Figures 6 and 7 of the drawings. In this form of the invention, a single transformer core 47 is provided for both high impedance windings 48 and 49. A core for the head is provided by a single lamination 50 having a curved upper edge 51 which is grooved as at 52 to receive the wire or other traveling magnetizable record member.

A wide strap of conducting material 53 in the form of a closed loop is wrapped substantially around the high impedance windings 48 and 49. It differs from the manner in which the strap is formed in the embodiment of the invention shown in Figures 3, 4 and 5, however, in that one side of the oval has been pulled in between the two coils 48 and 49 as at 54. This gives a more complete wrap around each of the windings 48 and 49. A pair of upright rods or fingers 55 and 56 extend up on opposite sides of the core 50 from the pulled-in portion 54 of the strap 53, and the straight portion 57 of the strap 53. The lower ends of the fingers 55 and 56 are electrically and mechanically secured to the strap 53, while the upper ends of the fingers 55 and 56 are provided with a bridging member 58 secured therebetween which lies in a slot in the core 50 which is also employed to provide the necessary confronting polar portions of the core 50.

By virtue of this, two low impedance coils having a portion 58 in common are inductively associated with the high impedance coils 48 and 49. The high impedance coils 48 and 49 are electrically connected together as at 59 to form a series connection, while the necessary leads 60 and 61 are provided for connecting the high impedance windings 48 and 49 to the external circuit. These windings 48 and 49 are so wound with respect to each other that induced currents produced by stray fields will oppose each other.

While I have shown several embodiments of my invention, it will, of course, be understood that I do not wish to be limited thereto, since many modifications may be made, and I, therefore, contemplate by the appended claims to cover all such modifications that fall within the true spirit and scope of my invention.

I claim as my invention:

1. An electromagnetic transducer head assembly comprising a core having a pair of spaced substantially parallel disposed legs, a pair of similar windings mounted on said legs and, means for inducing oppositely directed magnetic fields in said windings, an endless conducting strap partially encircling each of said windings, a bridging conductor connecting spaced points on said endless strap and dividing said endless strap into two symmetrical halves with said bridging conductor common to both halves, said head including means defining a path of travel for a magnetic record member to pass in proximity to said bridging member, whereby incremental lengths of said record member are magnetized when a time-varying current flows through said bridging member and a time-varying voltage is induced in said windings when a variably magnetized record member is passed in proximity to said bridging member.

2. An electromagnetic transducer head assembly comprising a core having a pair of spaced substantially parallel disposed legs, a pair of similar windings mounted on said legs and, means for inducing oppositely directed magnetic fields in said windings, a bridging conductor connecting spaced points on said endless strap and dividing said endless strap into two symmetrical halves with said bridging conductor common to both halves, said head including means defining a path of travel for a magnetic record member to pass in proximity to said bridging member, whereby incremental lengths of said record member are magnetized when a time-varying current flows through said bridging member and a time-varying voltage is induced in said windings when a variably magnetized record member is passed in proximity to said bridging member, the width of said strap being substantially the axial length of each of said windings.

3. An electromagnetic transducer head assembly comprising a core having a pair of spaced substantially parallel disposed legs, a pair of similar windings mounted on said legs and electrically connected in such a manner that when current flows therethrough flux is set up which flows in the same direction around said core, an endless conducting strap wrapped closely around a substantial portion of each of said windings and being substantially as wide as the axial length of each of said windings, a bridging conductor connecting spaced points on said endless strap and dividing said endless strap into two symmetrical halves with said bridging conductor common to both halves, said head including means defining a path of travel for a magnetic record member to pass in proximity to said bridging member, whereby incremental lengths of said record member are magnetized when a time-varying current flows through said bridging member and a time-varying voltage is induced in said windings when a variably magnetized record member is passed in proximity to said bridging member.

4. An electromagnetic transducer head assembly comprising a core having a pair of spaced substantially parallel disposed legs, a pair of similar windings mounted on said legs and, means for inducing oppositely directed magnetic fields in said windings, an endless conducting strap partially encircling each of said windings, a bridging conductor connecting spaced points on said endless strap and dividing said endless strap into two symmetrical halves with said bridging conductor common to both halves, said bridging conductor lying in a plane disposed between said windings, said head including means defining a path of travel for a magnetic record member to pass in proximity to said bridging member, whereby incremental lengths of said record member are magnetized when a time-varying current flows through said bridging member and a time-varying voltage is induced in said windings when a variably magnetized record member is passed in proximity to said bridging member.

5. An electromagnetic transducer head assembly comprising a core having a pair of spaced substantially parallel disposed legs, an integral base portion extending between said parallel legs at one end thereof and a pair of pole portions extending toward each other from the other end of said parallel legs, a pair of similar windings mounted on said legs, means for inducing oppositely directed magnetic fields in said windings, an endless conducting strap partially encircling each of said windings, a bridging conductor connecting spaced points on said endless strap and dividing said endless strap into two symmetrical halves with said bridging conductor common to both halves, said pole portions including means defining a path of travel for a magnetic record member to pass in proximity to said bridging member, whereby incremental lengths of said record member are magnetized when a time-varying current flows through said bridging member and a time-varying voltage is induced in said windings when a variably magnetized record member is passed in proximity to said bridging member.

6. An electromagnetic transducer head assembly comprising a core having a pair of spaced substantially parallel disposed legs, an integral base portion extending between said parallel legs at one end thereof and a pair of pole portions extending toward each other from the other end of said parallel legs, a pair of similar windings mounted on said legs, means for inducing oppositely directed magnetic fields in said windings, an endless conducting strap partially encircling each of said windings, said endless strap also including parallel portions lying on opposite sides of said pole portions, a bridging member extending between said parallel strap portions in the gap between said pole portions and secured to said parallel strap portions, said pole portions including means defining a path of travel for a magnetic record member to pass over said bridging member, whereby incremental lengths of said record member are magnetized when a time-varying current flows through said bridging member and whereby a time-varying voltage is induced in said windings when a variably magnetized record member is passed in proximity over said bridging member.

7. An electromagnetic transducer head assembly comprising a core having a pair of spaced substantially parallel disposed legs, an integral base portion extending between said parallel legs at one end thereof and a pair of pole portions extending toward each other from the other end of said parallel legs, a pair of similar windings mounted on said legs, means for inducing oppositely directed magnetic fields in said windings, an endless conducting strap partially encircling each of said windings, said strap including eight 45° open folds, four of said folds being on one side of said head and the other four folds being on the other side of said head, said folded endless strap including two substantially parallel portions lying on opposite sides of said pole portions, a bridging member extending between said parallel strap portions in the gap between said pole portions and secured to said parallel strap portions, said pole portions including means defining a path of travel for a magnetic record member to pass over said bridging member, whereby incremental lengths of said record member are magnetized when a time-varying current flows through said bridging member and whereby a time-varying voltage is induced in said windings when a variably magnetized record member is passed in proximity over said bridging member.

8. An electromagnetic transducer head assembly comprising a core having a pair of spaced substantially parallel disposed legs and having integral connecting portions at the opposite ends of said legs, thereby to provide a closed magnetic circuit, a pair of similar windings on said legs, means for inducing oppositely directed magnetic fields in said windings, an endless conducting strap partially encircling each of said windings a second core having means thereon defining a path of travel for a magnetic record member and including a pair of spaced confronting poles, an electrical conducting element extending through the gap between said pole portions and connected to spaced points on said endless strap, said points being located to divide said endless strap into two symmetrical halves with said electrical conducting element common to both halves whereby incremental lengths of said record member will magnetize when a time-varying current flows through said bridging member and a time-varying voltage is induced in said windings when a variably magnetized record member is passed in proximity to said bridging member.

9. An electromagnetic transducer head assembly comprising a core having a pair of spaced substantially parallel disposed legs and having integral connecting portions at the opposite ends of said legs, thereby to provide a closed magnetic circuit, a pair of similar windings on said legs, means for inducing oppositely directed magnetic fields in said windings, an endless conducting strap partially encircling each of said windings, a portion of said endless strap having an open bend extending through said first core to a region in proximity to another portion of said strap, a second core disposed in a plane offset from the plane of said first core, an electrical conducting element extending through the gap between said pole portions and connected to said bent portion of said endless strap which extends through said first core and to another point on said strap, said points being located to divide said endless strap into two symmetrical halves with said electrical conducting element common to both halves whereby incremental lengths of said record member will magnetize when a time-varying current flows through said bridging member and a time-varying voltage is induced in said windings when a variably magnetized record member is passed in proximity to said bridging member.

10. An electromagnetic transducer head assembly comprising a pair of cores, each core having a center leg and a closed magnetic circuit extending therearound, a winding on the center leg of each of said cores, said windings being similar, an endless conducting oval strap encircling said windings, a third core having a pair of spaced confronting pole portions and means defining a path of travel for a magnetic record member across the gap between said pole portions, and an electrical conducting element extending through said gap in said third core and electrically connected to diametrically opposite points on said endless oval strap, said points lying between said pair of cores.

11. An electromagnetic transducer head assembly comprising, a magnetic circuit structure having at least one core member, said magnetic circuit structure having a pair of spaced substantially parallel disposed legs, a pair of similar windings mounted on said legs, means for inducing oppositely directed magnetic fields in said windings, a secondary electrical circuit on said magnetic circuit structure composed of conducting strap material encircling at least part of each of said windings, a bridging conductor extending between and secured to spaced points on said strap circuit and dividing said strap circuit into two electrical halves with said bridging conductor common to both halves, said head including means defining a path of travel for a magnetic record member to pass in proximity to said bridging member, whereby incremental lengths of said record member are magnetized when a time-varying current flows through said bridging member and a time-varying voltage is induced in said windings when a variable magnetized record member is passed in proximity to said bridging member.

DAVID E. WIEGAND.

No references cited.